United States Patent
Jeong et al.

(10) Patent No.: US 7,308,109 B2
(45) Date of Patent: Dec. 11, 2007

(54) PORTABLE TERMINAL HAVING EARPHONE WINDING DEVICE BUILT THEREIN

(75) Inventors: Dong Jeong, Gumi-si (KR); Jong-Gun Bae, Gumi-si (KR); Young-Chun Kim, Gumi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 457 days.

(21) Appl. No.: 10/838,374

(22) Filed: May 5, 2004

(65) Prior Publication Data

US 2005/0008185 A1    Jan. 13, 2005

(30) Foreign Application Priority Data

Jul. 3, 2003    (KR) ...................... 10-2003-0044912

(51) Int. Cl.
*H04R 25/00* (2006.01)
*B65H 75/48* (2006.01)

(52) U.S. Cl. .................... 381/384; 381/380; 242/385.3

(58) Field of Classification Search ................ 381/370, 381/371, 374, 379, 380, 384; 379/433.02, 379/438, 446; 242/385, 385.1, 385.2, 385.3; 455/569.1, 575.2
See application file for complete search history.

(56) References Cited

U.S. PATENT DOCUMENTS 1,116,402 A * 11/1914 Ferguson ............... 379/387.01
6,082,656 A * 7/2000 Thornton ................. 242/385.4
6,199,674 B1 * 3/2001 Liao .......................... 191/12.4
6,731,956 B2 * 5/2004 Hanna et al. ............ 455/569.1
2003/0035562 A1 * 2/2003 Schmidt et al. ............. 381/370

FOREIGN PATENT DOCUMENTS

JP    62191382 A  *  8/1987

* cited by examiner

*Primary Examiner*—Sinh Tran
*Assistant Examiner*—Joseph Saunders, Jr.
(74) *Attorney, Agent, or Firm*—Roylance, Abrams, Berdo & Goodman, L.L.P.

(57) ABSTRACT

An earphone winding device in a portable terminal using an earphone is disclosed. The earphone winding device comprises a housing formed in a portable terminal body. A rotational bobbin is rotatably fit in the housing. It has, at a center thereof, a spiral spring for applying an elastic force to the rotational bobbin and thus rotating the rotational bobbin. A stopper is formed at a predetermined position on the lower surface of the rotational bobbin, for restraining the rotation of the rotational bobbin or releasing the rotational bobbin from the restraint. An earphone cord is wound around the rotational bobbin, connected to the earphone. An earphone hanger is formed at a predetermined position on an outer side surface of the body, for hanging or picking up the earphone thereover or therefrom. A connector unit is formed on the lower surface of the body, for contacting an earphone cord.

20 Claims, 12 Drawing Sheets

PORTABLE TERMINAL HAVING EARPHONE WINDING DEVICE BUILT THEREIN

PRIORITY

This application claims priority under 35 U.S.C. § 119 to an application entitled "Portable Terminal Having Earphone Winding Device Built Therein" filed in the Korean Intellectual Property Office on Jul. 3, 2003 and assigned Ser. No. 2003-44912, the contents of which are incorporated herein by reference.

BACKGROUND OF THE INVENTION

1. Field of the Invention

The present invention relates generally to a portable terminal, and in particular, to a portable terminal having an earphone winding device built therein, for automatically pulling out or retracting an earphone cord.

2. Description of the Related Art

As communication or audio devices such as a portable mini cassette recorders and MP3 players have been reduced in size, necklace strings and necklace-type earmicrophones are being widely used. The necklace strings are worn around the neck to transport the electronic devices, and the necklace-type earmicrophones are also passed around the neck, electrically connected to the portable electronic devices.

The rapid proliferation of portable phones regardless of user age, has generated a demand for the development of as different portable phone accessories as there are tastes of users. Hence, most portable phone accessories are not merely functional portable phone accessories, but must also operate as independent ornaments. Therefore, portable phone accessories are designed to have sufficient durability, functional uniformness, and a stylish look.

Referring to FIG. 1, a necklace-type ear microphone 10 is provided with a necklace string 11. An earphone 20 is connected at a portion of the necklace string 11 by means of a wire of a predetermined length. At another portion of the necklace string 11 is formed a transmitter 30 with a container 31, a microphone 32, and a transceiver button 33 to originate or terminate a call in or from a body 1 of a portable terminal therewith. The container 31, microphone 32, and transceiver button 33 are incorporated in the transmitter 30. An earphone jack 41, electrically connected to the body 1, and a cord 42, tied to the body 1, are provided at a desired lower portion of the necklace string 11. Under this condition, a connection member 40 is integrally connected to the necklace string 11.

Since the earphone is separated from the body of the portable terminal, it is carried together with the portable terminal, which makes it inconvenient to carry the earphone all the time.

Another shortcoming of the conventional earphone is that the earphone is taken out from somewhere and connected to the body, for use, thereby making it more inconvenient to use.

In addition, the earphone is vulnerable to an external shock or contact due to its exposure whenever it is used or stored. If the earphone is not kept in good shape, it may be disfigured and/or malfunction.

SUMMARY OF THE INVENTION

An object of the present invention is to substantially solve at least the above problems and/or disadvantages and to provide at least the advantages below. Accordingly, an object of the present invention is to provide a portable terminal having an earphone winding device that automatically pulls out or retracts an earphone cord, to promote the convenient use of an earphone.

Another object of the present invention is to provide a portable terminal having an earphone winding device that automatically pulls out or retracts an earphone cord, to prevent disfiguration and breakage of an earphone.

In accordance with an embodiment of the present invention, an earphone winding device in a portable terminal using an earphone, comprises a housing formed in a body of the portable terminal. A rotational bobbin is fit in the housing so that the rotational bobbin is rotatable. The rotational bobbin has, at a center thereof, a spiral spring for applying an elastic force to the rotational bobbin and thus rotating the rotational bobbin. A stopper is formed at a predetermined position on the lower surface of the rotational bobbin, for restraining the rotation of the rotational bobbin or releasing the rotational bobbin from the restraint on rotation along with the rotation of the rotational bobbin. An earphone cord is wound around the rotational bobbin, while being connected to the earphone. An earphone hanger is formed at a predetermined position on an outer side surface of the body, for hanging or picking up the earphone thereover or therefrom. A connector unit is formed on the lower surface of the body, for coming into an electrical contact with an earphone cord.

BRIEF DESCRIPTION OF THE DRAWINGS

The above and other objects, features and advantages of the present invention will become more apparent from the following detailed description when taken in conjunction with the accompanying drawings in which.

Figure 1:
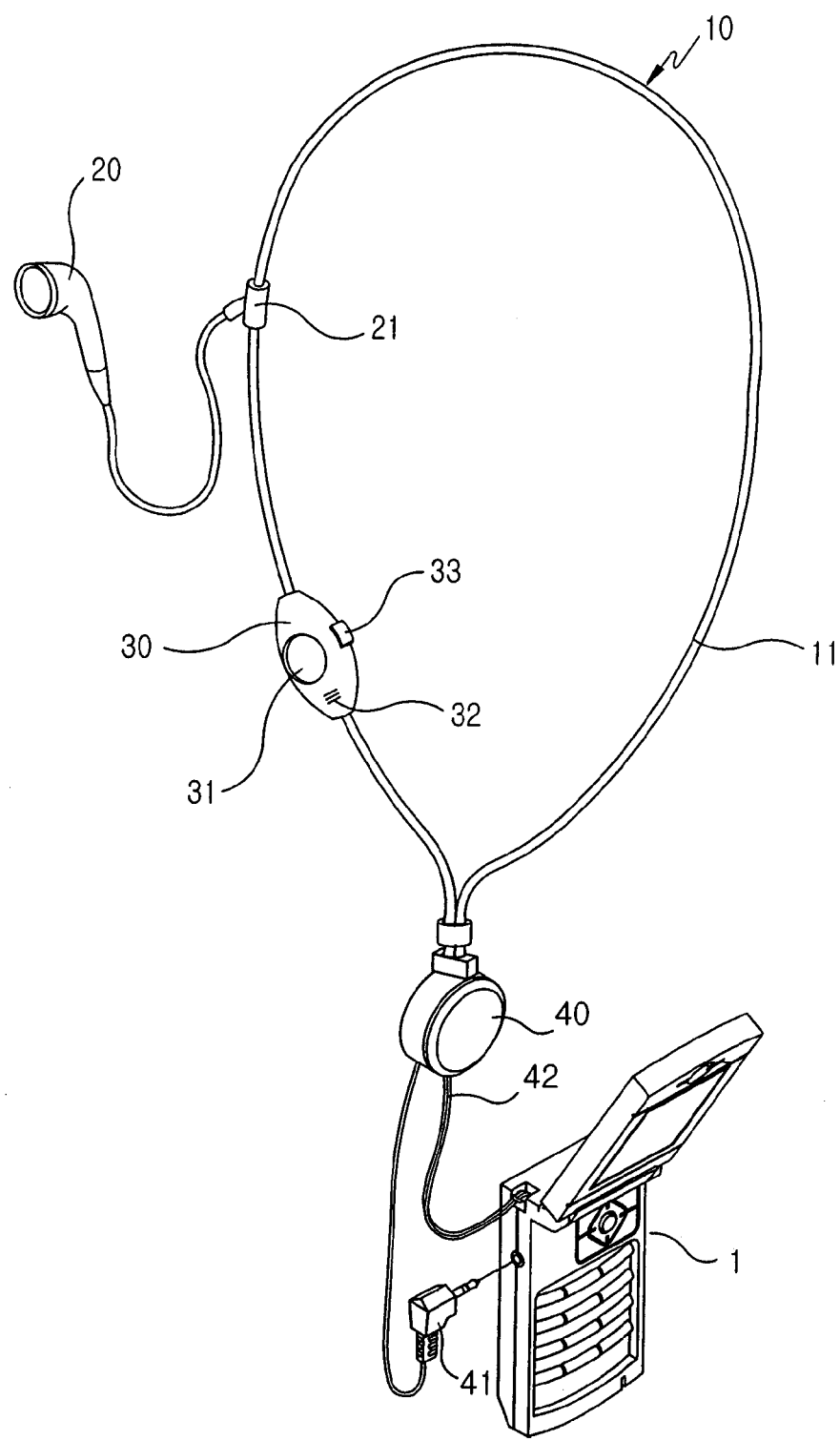
FIG. 1 is a perspective view of a conventional folder-type portable terminal connected to an earmicrophone.

DETAILED DESCRIPTION OF THE
PREFERRED EMBODIMENT

A preferred embodiment of the present invention will be described herein below with reference to the accompanying drawings. In the following description, well-known functions or constructions are not described in detail since they would obscure the invention in unnecessary detail.

Referring to FIGS. 2 to 12, a portable terminal 100 having an earphone winding device built therein comprises a housing 300, a rotational bobbin 400, a stopper 500, an earphone cord 600, an earphone hanger 700, and connector 800. The housing 300 is provided in a body 200 of the portable terminal 100 so that the rotational bobbin 400 can be coupled rotatably to the housing 300. The rotational bobbin 400 is provided with a spiral spring 404 therein which applies an elastic force to the central interior of the rotational bobbin 400. In this state, the rotational bobbin 400 is fit in the housing 300. The stopper 500 is provided at a desired side portion on the lower surface of the rotational bobbin 400 in order to lock the rotation of the rotational bobbin 400 or release it from the anti-rotation lock mode. The earphone cord 600, connected to an earphone 900, is pulled out from or retracted around the rotational bobbin 400. The earphone hanger 700 is disposed at a desired position on an outer side surface of the body 200, adapted to allow the earphone 900 to be attached to or detached from the body 200. The connector unit 800 is formed at a desired position on the lower surface of the body 200 to come into electrical contact with the earphone cord 600.

The body 200 comprises an upper case frame 201 and a lower case frame 202. The housing 300 is provided in the lower case frame 202. The body 200 is provided, at a desired position on an outer side surface thereof, with a through hole 204 adapted to allow the earphone cord 600 to extend therethrough. The housing 300 includes a plurality of guides and a cord hole 302. The guides 301 are arranged at a desired position in the housing 300 such that they, in engagement with a locker 502, guide the locker 502 to rotationally move clockwise or counterclockwise. The guides 301 are curved. The cord hole 302 is formed at a side surface of the housing 300, adapted to allow the earphone cord 600 to be pulled out from or retracted to the housing 300 therethrough.

The guides 301 comprise a first guide rail 301a, a second guide rail 301b, and a guide protrusion 301c. The first and second guide rails 301a and 301b are formed at a desired position in the coupling portion in order to guide the locker 502 of the stopper 500 to rotationally move clockwise or counterclockwise. The guide protrusion 301c is interposed between the first and second guide rails 301a and 301b to restrict the degree of rotation of the locker 502. In the vicinity of the housing 300 is formed a cord cap 1000 adapted to allow the earphone cord 600 to pass therethrough and thus guide the pull-out and retraction of the earphone cord 600.

The rotational bobbin 400 is provided with a spring hole 401, a through hole 402, a spring cap 403, and the spiral spring 404. The spring hole 401 is formed at a center portion of the rotational bobbin 400 to allow the spiral spring 404 to fit therein. The spring hole 401 is provided at a center thereof with the through hole 402 adapted to allow a fixing member 2001 of a spring coupling portion 2000 to extend therethrough. The spring cap 403 is mounted on the spring hole 401 to protect and support the spiral spring 404. The housing 300 and the rotational bobbin 400 are provided with the spring coupling portion 2000 to be coupled to the spiral spring 404.

The spring coupling portion 2000 comprises the fixing member 2001 and an engagement member 2002. The fixing member 2001 is formed at the center portion of the housing 300 so that it applies an elastic force of the spiral spring 404 in engagement with a central end 404a of the spiral spring 404. The engagement member 2002 is formed at a desired position on the circumference of the spring hole 401, while being engaged with the other end 404b of the spiral spring 404 in order to apply the elastic force of the spiral spring 404 in the state where the fixing member 2001 is coupled to the end 404a of the spiral spring 404.

The stopper 500 comprises a pair of stopper protrusions 501 and the locker 502. The stopper protrusions 501 are formed on the lower surface of the rotational bobbin 400, adapted to stop the rotational bobbin 400 caught in the locker 502 during the rotation of the bobbin 400, or release the rotation bobbin 400 from the locker 502. The locker 502 is engaged with the first and second guide rails 301a and 301b and the guide protrusion 301c. As the stopper protrusions 501 are rotated together with the rotational bobbin 400 in pulling out or retracting the earphone cord 600 from or around the rotational bobbin 400, the locker 502 is locked to the stopper protrusions 501, thereby locking the rotation of the rotational bobbin 400 or releasing it from the lock mode.

The stopper protrusions 501 are arranged symmetrically, facing each other. Each of the stopper protrusions 501 is provided, at one surface thereof, with a jaw 501a to be engaged with the locker 502 and, at the other surface thereof, with a contact surface 501b to come into contact with the locker 502. The locker 502 comprises a coupling hole 502a and first and second engagement portions 502b and 502c. The coupling hole 502a is formed centrally at the locker 502 so that it restricts, in engagement with the guide protrusion 301c of the guides 301, the clockwise or counterclockwise rotational movement of the locker 502 to a predetermined degree. The first engagement portion 502b is formed at one lower portion of the locker 502. Along with the clockwise or counterclockwise rotation of the rotational bobbin 400, the first engagement portion 502b comes into contact with the stopper protrusions 501 of the rotational bobbin 400 and rotationally moves the locker 502 clockwise or counterclockwise. The second engagement portion 502c is formed at the other lower portion of the locker 502. When a user pulls out the earphone cord 600 to a desired length, the rotational bobbin 400 rotates counterclockwise. If the user lets the earphone cord 600 go, the rotational bobbin 400 rotates clockwise by the elastic force of the spiral spring 404 applied thereto and the second engagement protrusion 502c is caught in one of the stopper protrusions 501. Under this condition, when the user pulls out the earphone cord 600 and then lets it go, the second engagement portion 502c is set free from the stopper protrusion 501, allowing the rotational bobbin 400 to rotate clockwise by the elastic force of the spiral spring 404 applied thereto.

The earphone hanger 700 is provided with a hanger member 701 and a fixing member 702. The hanger member 701 allows the earphone 900 to be detached therefrom or be hung thereover. The fixing member 702 is formed at a side of the earphone hanger 700, while being fit in the hole 203 formed at the side surface of the body 200 and fixed to the hanger member 701.

The connector unit 800 comprises an earphone terminal 801 and a power terminal 802. The earphone terminal 801 is formed on the lower surface of the lower case frame 202 of the body 200, adapted to bring the earphone cord 600 into electrical contact with a main printed circuit board (PCB: not shown) provided in the body 200. The power terminal 802 is positioned in the vicinity of the earphone terminal 801 to supply power to the earphone cord, thereby activating the earphone 900.

The assembling process and operation of the portable terminal with the earphone winding device built therein, having the above described configuration according to the embodiment of the present invention described above, will now be described in detail with reference to FIGS. 2 to 14.

Figure 2:
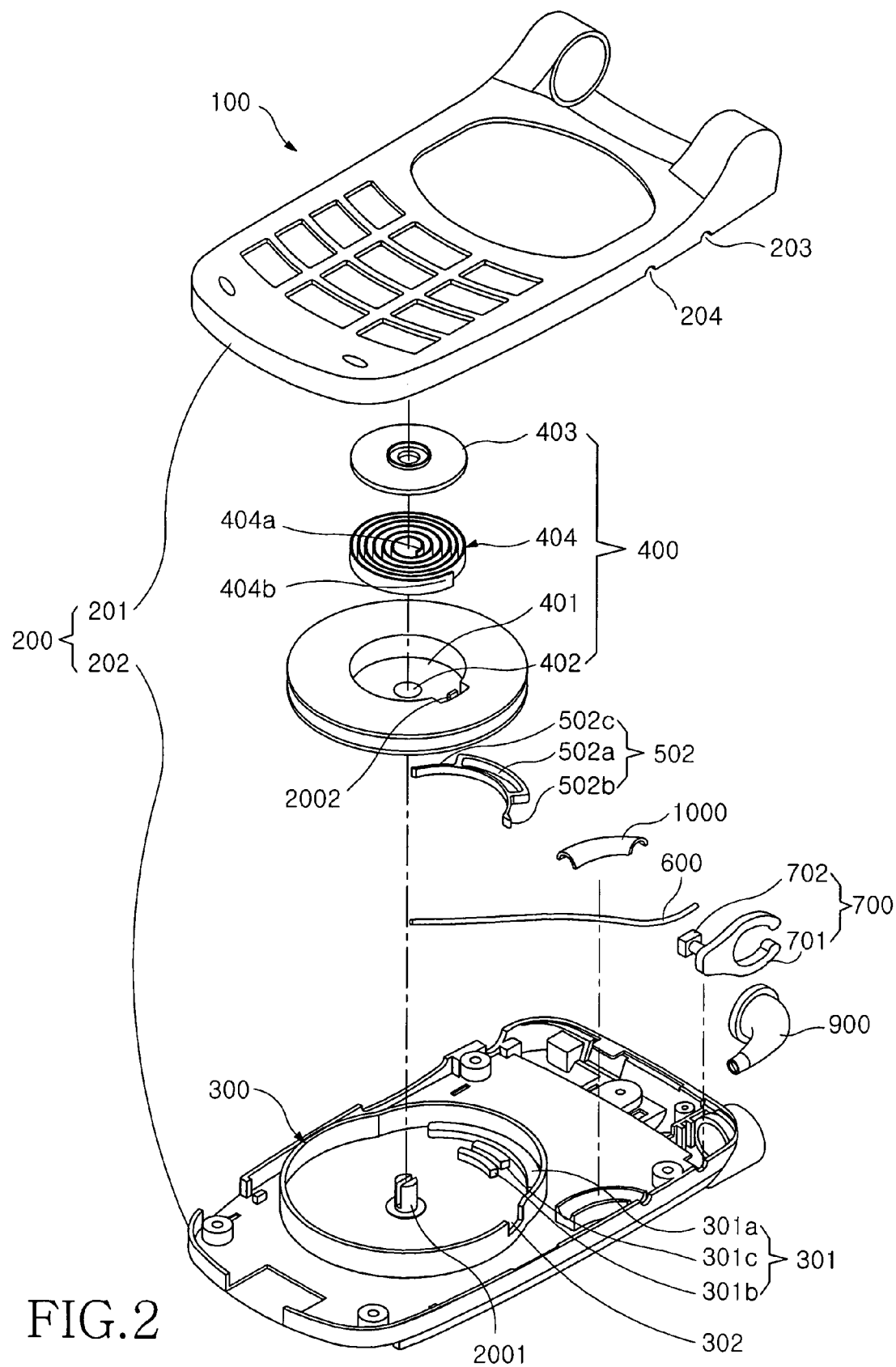
FIG. 2 is an exploded perspective view of a portable terminal having an earphone winding device built therein according to an embodiment of the present invention.
Figure 3:
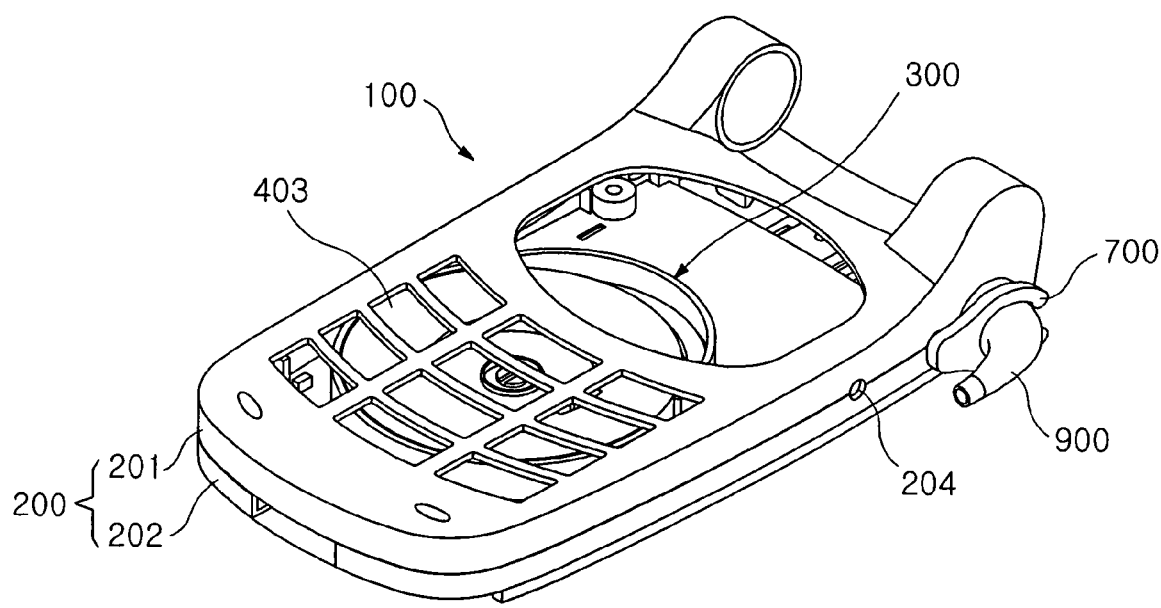
FIG. 3 is a perspective view of the portable terminal having the earphone winding device built therein in an assembled state according to the embodiment of the present invention.

As illustrated in FIGS. 2 and 3, the body 200 of the portable terminal includes the upper and lower case frames 201 and 202, and the lower case frame 202 is provided with the housing 300 formed therein. The rotational bobbin 400 is laid in the housing 300, while being provided with the spiral spring 404 to apply an elastic force to the rotational bobbin 400 and rotate it. The housing 300 is provided, at a center portion thereof, with the fixing member 2001 engaged with the central end 404a of the spiral spring 404. The rotational bobbin 400 is fit in the housing 300, while the fixing member 2002 extends through the through hole 402 formed at the center portion of the spring hole 401 of the rotational bobbin 400.

Figure 4:
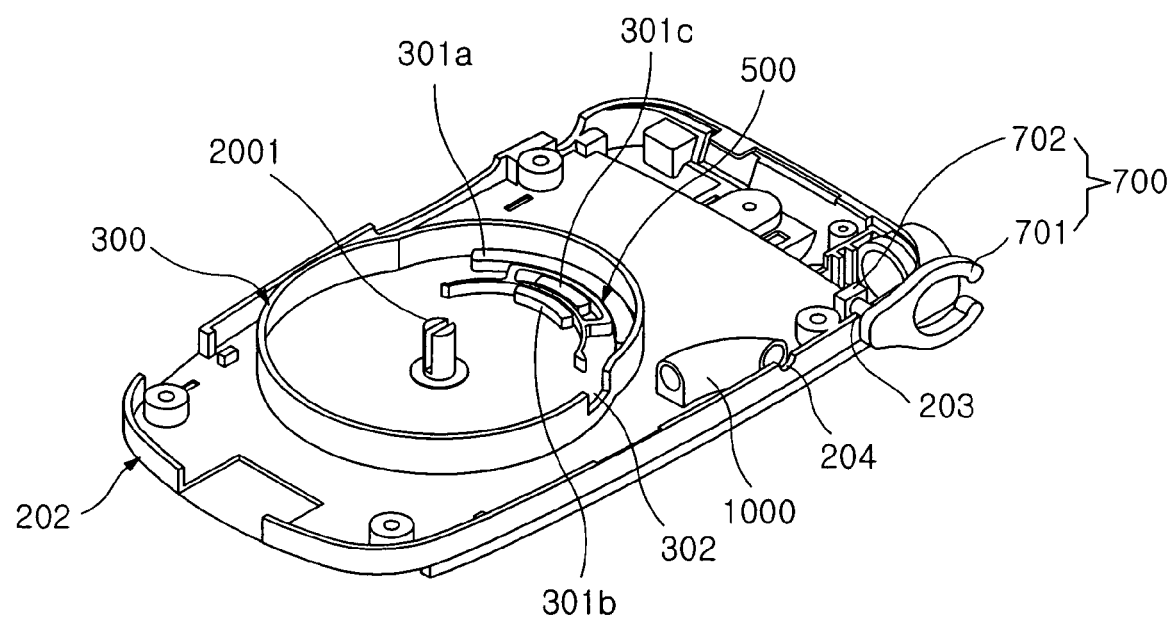
FIG. 4 is a perspective view of a coupling portion of a lower case frame included in the portable terminal having the earphone winding device built therein according to the embodiment of the present invention.
Figure 5:
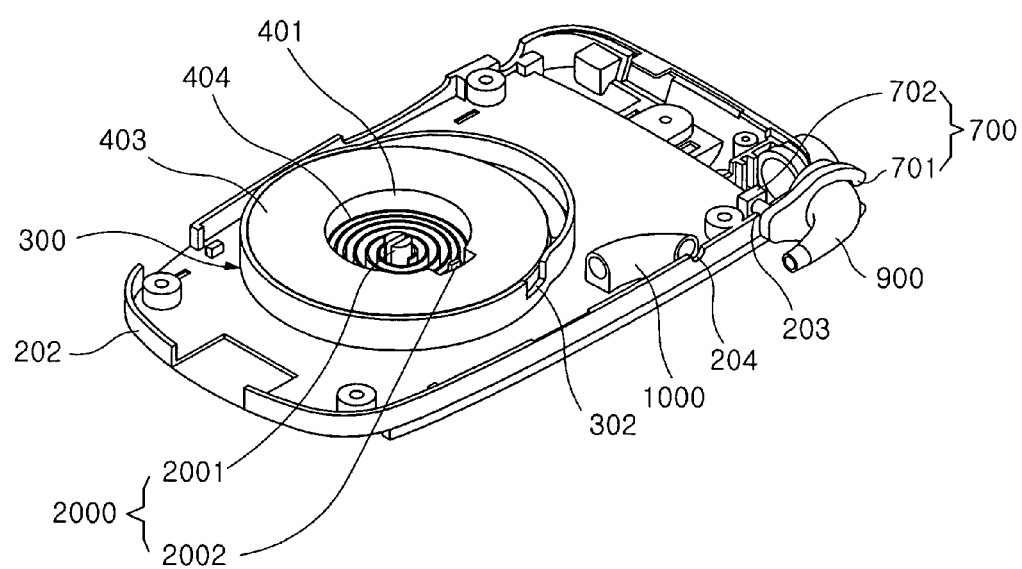
FIG. 5 is a perspective view of the coupling portion of the lower case frame, to which a rotational bobbin is mounted in the portable terminal having the earphone winding device built therein according to the embodiment of the present invention.
Figure 6:
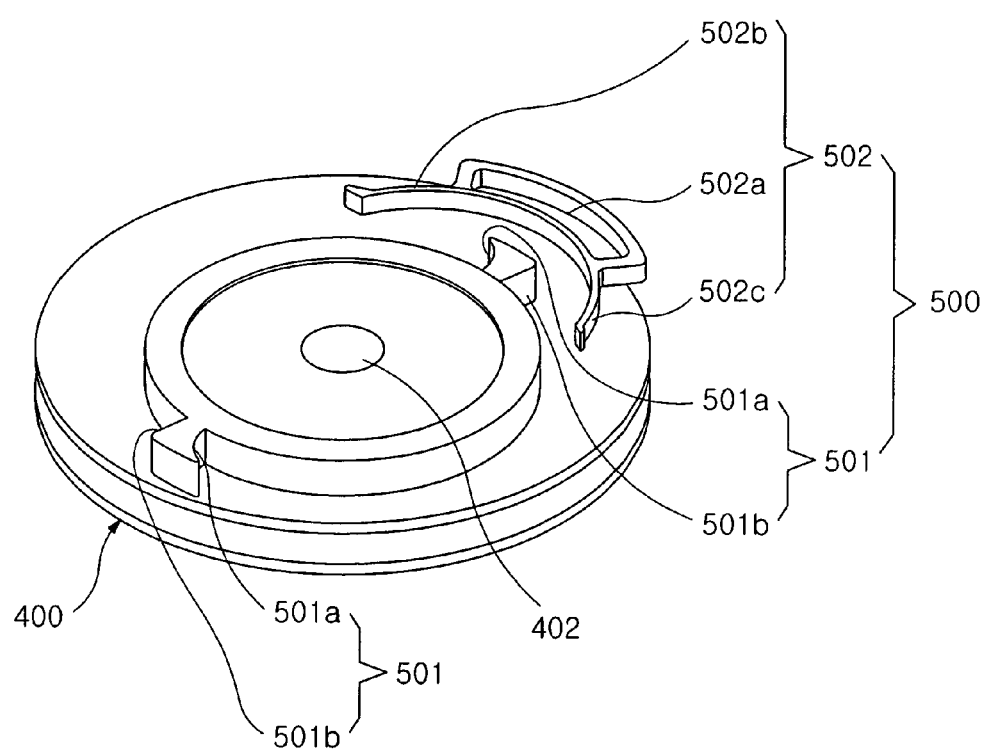
FIG. 6 is a bottom view of the rotational bobbin coupled to a stopper in the portable terminal having the earphone winding device built therein according to the embodiment of the present invention.

As illustrated in FIGS. 4 and 6, the pair of stopper protrusions 501 are formed on the lower surface of the rotational bobbin 400, and the locker 502 is provide in the housing 300, adapted to be locked to the stopper protrusions 501.

As illustrated in FIG. 6, the locker 502 is engaged with the first and second guide rails 301a and 301b (shown in FIG. 4) and the guide protrusion 301c of the guide 301 formed at a desired position in the housing 300.

Under this condition, the spiral spring 404 is inserted in the spring hole 401 at the center portion of the rotational bobbin 400, while the central end 404a of the spiral spring 404 is engaged with the fixing member 2001 at the center of the housing 300 and the other end 404b thereof is engaged with the engagement member 2002 formed at a desired position on the circumference of the spring hole 401. The spring cap 403 covers the spring hole 401 to protect and support the spiral spring 404. The earphone cord 600 is wound around the rotational bobbin 400. The earphone cord 600 can be pulled out or retracted through the cord hole 302 formed on a side surface of the housing 300.

Since the cord cap 1000 is formed in the vicinity of the housing 300, the earphone cord 600 is passed under the cord cap so that the cord cap 1000 can guide the pull-out and retraction of the earphone cord 600.

Figure 7:
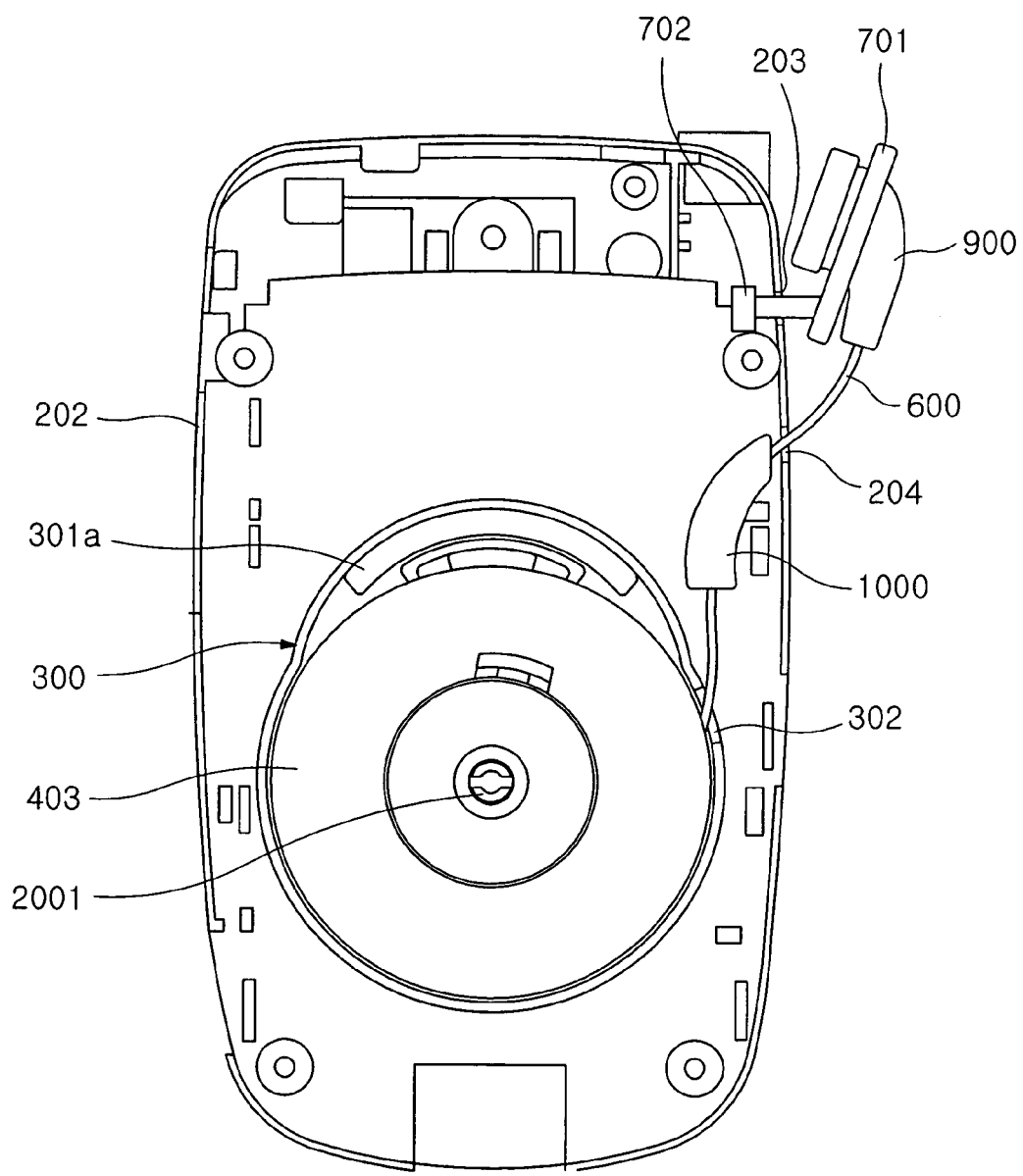
FIG. 7 is a plan view of the portable terminal having the earphone winding device built therein in an assembled state according to the embodiment of the present invention.
Figure 8:
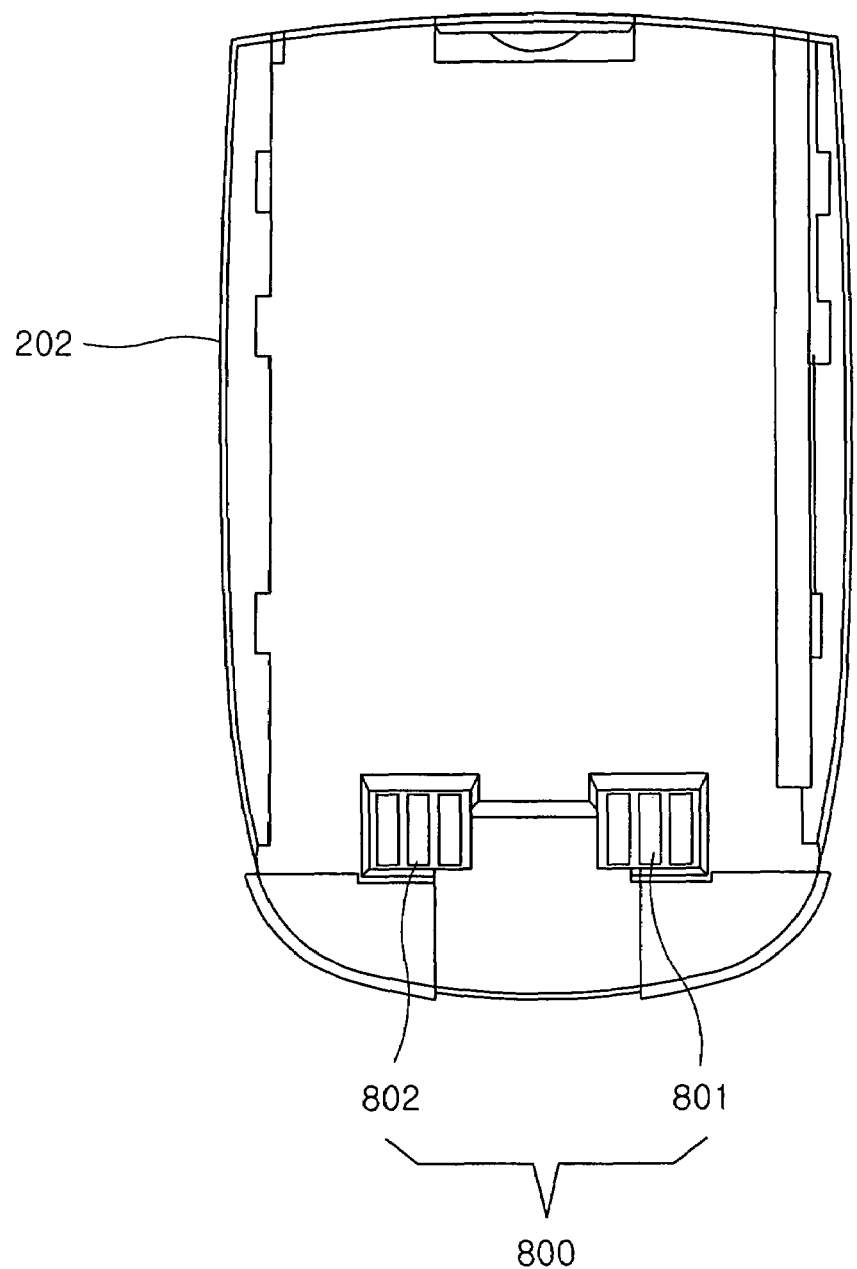
FIG. 8 is a bottom view of the lower case frame having connectors in the portable terminal having the earphone winding device built therein according to the embodiment of the present invention.

Under this condition, as illustrated in FIG. 7, the earphone hanger 700 is provided at a desired portion on a side surface of the body 200, for hanging or detaching the earphone 900 thereover or therefrom. The earphone 900 is inserted into the earphone hanger 700.

Figure 9:
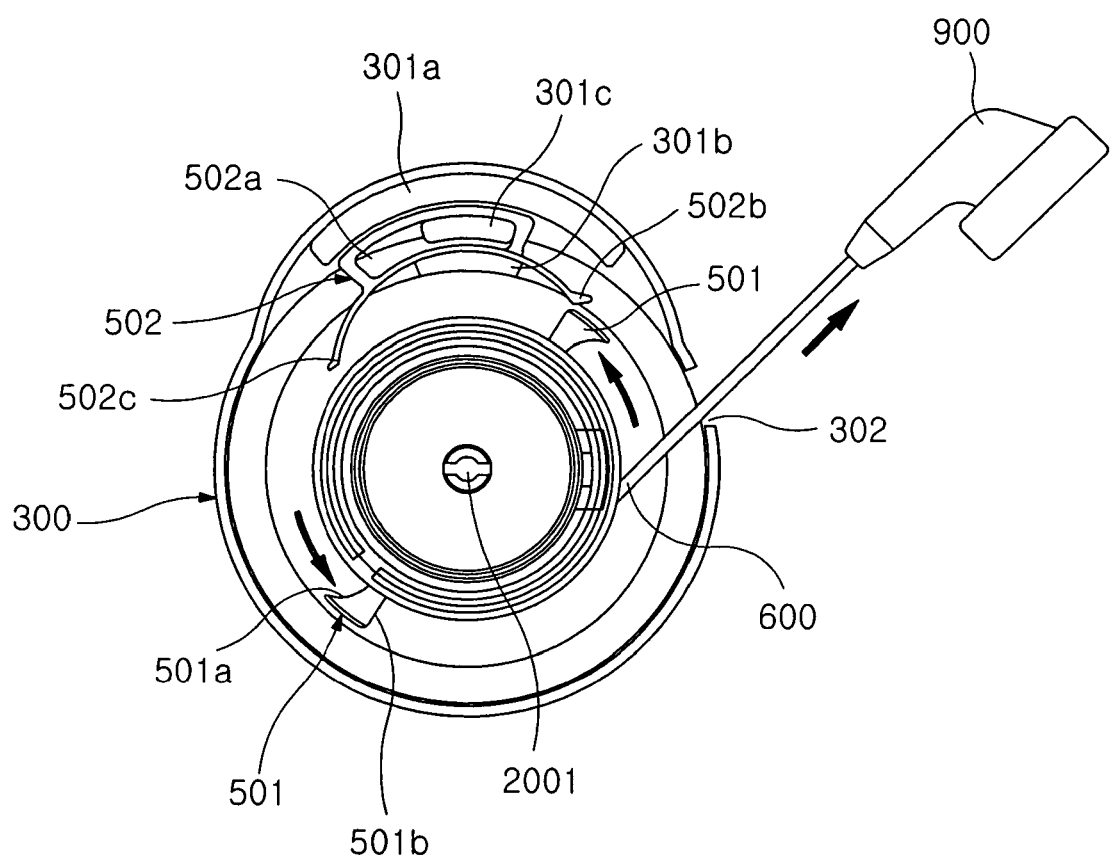
FIG. 9 is a plan view of the earphone winding device in an operation state where an earphone cord is pulled out from the rotational bobbin according to the embodiment of the present invention.

As illustrated in FIG. 9, to use the earphone 900, the user takes out the earphone 900 from the earphone hanger 700 and pulls the earphone cord 600 to a desired length.

Figure 10:
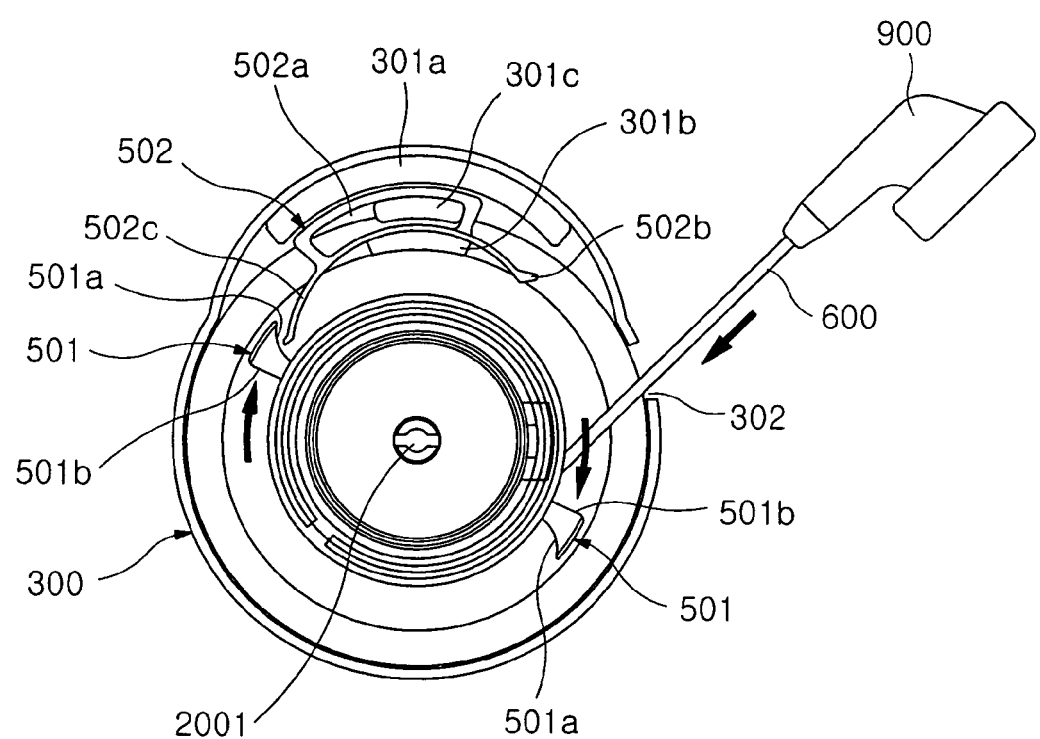
FIG. 10 is a plan view of the earphone winding device in an operation state where the rotation of the rotational bobbin is locked after the pull-out of the earphone cord from the rotational bobbin according to the embodiment of the present invention.

If the user lets the earphone cord 600 go in this state, the rotational bobbin 400 rotates clockwise by the elastic force of the spiral spring applied thereto and one of the stopper protrusions 501 is locked to the second engagement portion 502c of the locker 502, as illustrated in FIG. 10. The stopper protrusion 501 has the jaw 501a caught in the second engagement portion 502c. In this state, the user uses the earphone 900.

Figure 11:
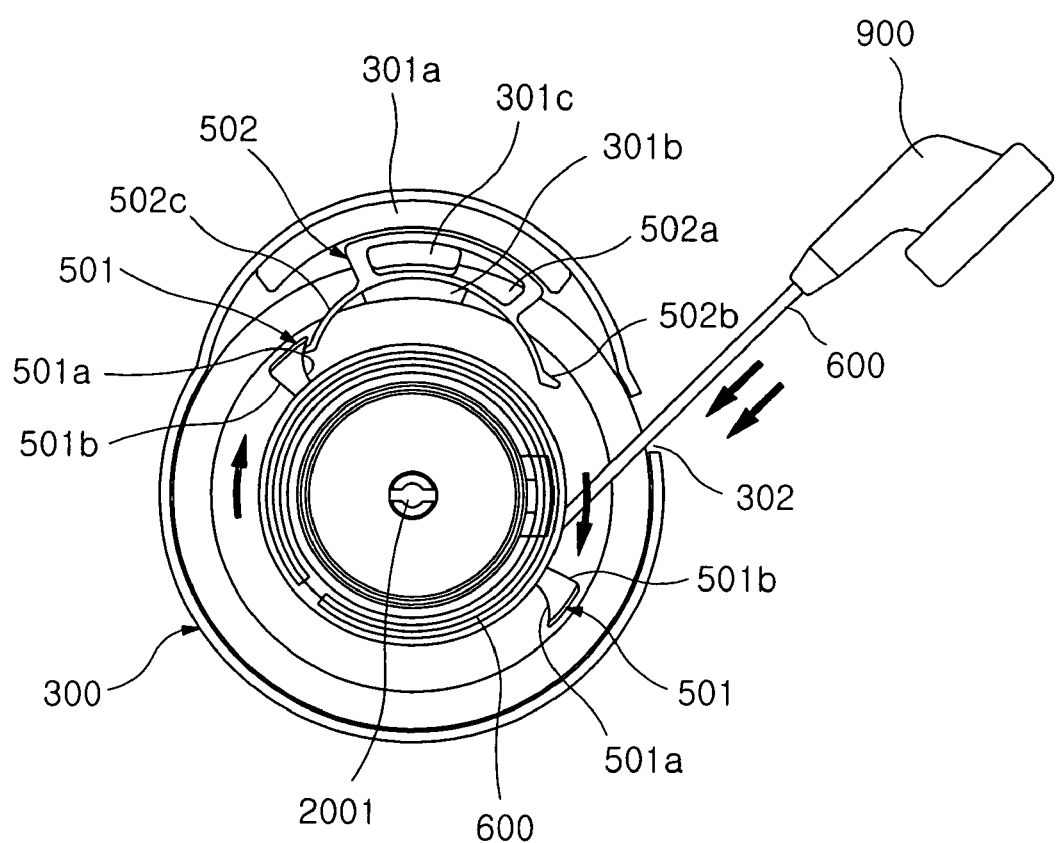
FIG. 11 is a plan view of the earphone winding device in an operation state where the rotational bobbin is released from the anti-rotation lock mode according to the embodiment of the present invention.

If the user wants to wind the earphone cord 600 around the rotational bobbin 400 after using the earphone 900, he pulls the earphone cord 600 and then lets it go. The stopper protrusion 501 is then set free from the second engagement portion 502c, while the rotational bobbin 400 rotates clockwise by the elastic force of the spiral spring 404 applied thereto, as illustrated in FIGS. 11 and 12.

In this process, the contact surface 501b of the stopper protrusion 501 comes into contact with the first engagement portion 502b of the locker 502 and pushes the locker 502 to a predetermined degree, thereby rotationally moving the locker 502 clockwise.

Figure 12:
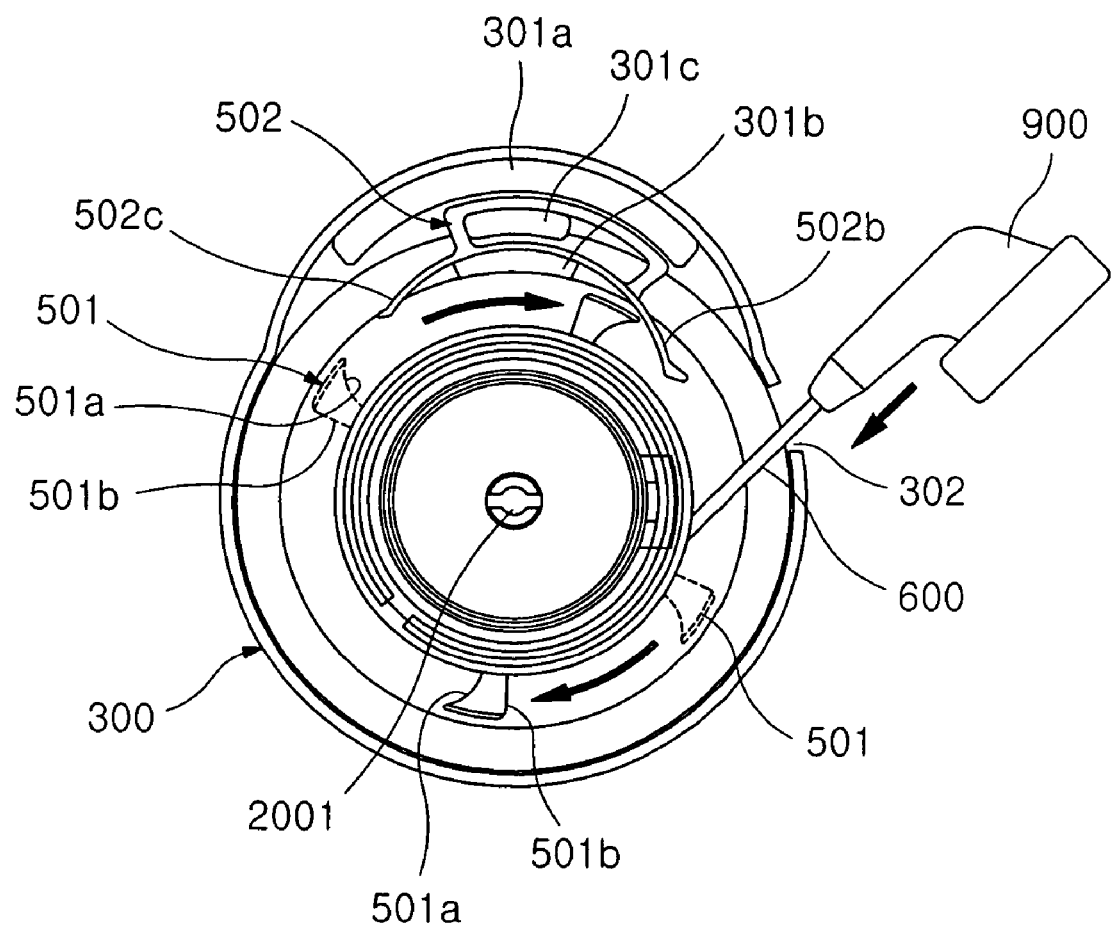
FIG. 12 is a plan view of the earphone winding device in an operation state where the earphone cord is retracted around the rotational bobbin.

As illustrated in FIG. 12, as the second engagement portion 502c of the locker 502 rotationally moves clockwise, the jaws 501a of the stopper protrusions 501 are not caught in the second engagement portion 502c, thereby rotating the rotational bobbin 400 clockwise. Thus, the earphone cord 600 is retracted around the rotational bobbin 400.

The portable terminal provided with the earphone winding device in accordance with the present invention described above allows for automatic pull out and retraction of the earphone cord 600. Therefore, efficient use of the earphone is promoted because the earphone 900 is pulled out or wound easily.

While the invention has been shown and described with reference to a certain preferred embodiment thereof, it is merely an exemplary application. For example, the present invention is not limited to a folder-type portable terminal. It is applicable to any type of portable terminal. Thus, it will be understood by those skilled in the art that various changes in form and details may be made therein without departing from the spirit and scope of the invention as defined by the appended claims.

What is claimed is:

1. An earphone winding device in a portable terminal using an earphone, comprising:

a housing formed in a body of the portable terminal;

a rotational bobbin fit in the housing so that the rotational bobbin is rotatable, the rotational bobbin having, at a center thereof, a spiral spring for applying an elastic force to the rotational bobbin and thus rotating the rotational bobbin;

an earphone cord wound around the rotational bobbin, while being connected to the earphone;

a stopper formed at a predetermined position on a lower surface of the rotational bobbin, for rotating or restraining the rotational bobbin by pulling an earphone cord clockwise and releasing it from the restraint when the earphone cord is wound counterclockwise, the stopper including:

at least one stopper protrusion on the rotational bobbin;

a guide rail formed at a predetermined position in the housing;

a locker supported on the guide rail and being movable in an arcuate path in a clockwise or counterclockwise direction between a first position and a second position, said locker having a first end and a second end, said stopper protrusion engaging said first end of said locker and moving the locker to the first position when said rotational bobbin rotates in a first direction, and said stopper protrusion engaging said second end of said locker and moving the locker to the second position when said rotational bobbin rotates in a second direction;

an earphone hanger formed at a predetermined position on an outer side surface of the body, for hanging or picking up the earphone thereto or therefrom; and a connector unit formed on a lower surface of the body, for coming into an electrical contact with an earphone cord.

2. The earphone winding apparatus of claim 1, wherein the body comprises an upper case frame and a lower case frame, and the housing is formed in the lower case frame.

3. The earphone winding apparatus of claim 1, further comprising a through hole at a predetermined position on a side surface of the body, for allowing the earphone cord to extend therethrough.

4. The earphone winding apparatus of claim 1, wherein the housing comprises:
a plurality of guide rails formed at a predetermined position within the housing for supporting said locker; and
a cord hole formed at a predetermined position on a side surface of the housing, for allowing the earphone cord to extend into or retract from the housing therethrough.

5. The earphone winding apparatus of claim 4, wherein the guide rails comprise:
a first guide rail and a second guide rail, each for rotationally guiding the locker of the stopper clockwise or counter clockwise; and
a guide protrusion between the first and second guide rails, for regulating the range of the rotational movement of the locker.

6. The earphone winding apparatus of claim 5, wherein the first guide rail is curved and longer than the second guide rail.

7. The earphone winding apparatus of claim 1, further comprising a cord cap in the vicinity of the housing, for allowing the earphone cord to extend therethrough and guiding the earphone cord to be pulled out or retracted.

8. The earphone winding apparatus of claim 1, wherein the rotational bobbin further comprises:
a spring hole formed at a center portion of the rotational bobbin, for allowing the spiral spring to be fit therein; and
a spring cap mounted on the spring hole, for protecting and supporting the spiral spring.

9. The earphone winding apparatus of claim 1, further comprising a spring coupling portion coupled to the spiral spring in the housing and the rotational bobbin.

10. The earphone winding apparatus of claim 9, wherein the spring coupling portion comprises:
a fixing member formed at a center portion of the housing, while being engaged with a central end of the spiral spring; and
an engagement member formed at a predetermined position along on the circumference of the spring hole of the rotational bobbin, while being engaged with the other end of the spiral spring.

11. The earphone winding apparatus of claim 4, wherein the stopper further comprises:
a pair of stopper protrusions formed on a lower surface of the rotational bobbin; and
where said locker engages the guide protrusion of the guides, for being locked to the stopper protrusions, thereby locking the rotational bobbin or releasing the rotational bobbin from the locked state, when the stopper protrusions are rotated together with the rotational bobbin in pulling out or retracting the earphone cord from or around the rotational bobbin.

12. The earphone winding apparatus of claim 11, wherein the stopper protrusions are symmetrically arranged, facing each other.

13. The earphone winding apparatus of claim 11, wherein each of the stopper protrusions has, at one surface thereof, ajaw for being engaged with the locker and, at the other surface thereof, a contact surface for coming into contact with the locker.

14. The earphone winding apparatus of claim 11, wherein the housing includes a guide protrusion between the guide rails, and where the locker comprises:
a coupling hole formed at a center portion of the locker, for restricting, in engagement with the guide protrusion, the clockwise or counterclockwise rotational movement of the locker to a predetermined degree;
a first engagement portion formed at one lower portion of the locker, for along with the clockwise and counterclockwise rotation of the rotational bobbin, coming into contact with the contact surface of one of the stopper protrusions and being pushed simultaneously, thereby rotationally moving the locker clockwise or counterclockwise; and
a second engagement portion formed at an opposite lower portion of the locker, for being caught in one of the stopper protrusions in a state where when the earphone cord is pulled out, the rotational bobbin rotates counterclockwise, and then the earphone cord is let go, the rotational bobbin rotates clockwise by the elastic force of the spiral spring applied thereto, and being set free from the stopper protrusion, allowing the rotational bobbin to rotate clockwise by the elastic force of the spiral spring applied thereto, when the earphone cord is pulled and then let to go with the second engagement member caught in the stopper protrusion.

15. The earphone winding apparatus of claim 1, wherein the earphone hanger comprises:
a hanger member for allowing the earphone to be detached therefrom or be hung thereover; and
a fixing member formed at a side of the earphone hanger, while being fit in a hole formed at the side surface of the body and fixed to the hanger member.

16. The earphone winding apparatus of claim 1, wherein the connector unit comprises:
an earphone terminal for bringing the earphone cord into electrical contact with a main PCB provided in the body of the portable terminal; and
a power terminal formed in the vicinity of the earphone terminal, for supplying power to the earphone cord, thereby activating the earphone.

17. The earphone winding device of claim 4, wherein
said first end of said locker when in said first position contacts said stopper protrusion and moves to said second position to prevent rotation of said rotational bobbin in said first direction; and
said second end of said locker when in said second position contacts said stopper protrusion and moves said locker to said first position and allows rotation of said rotational bobbin in said second direction.

18. The earphone winding device of claim 17, wherein
said first end of said locker has a flexible first engagement portion wherein release of said stopper protrusion from said first end when said locker is in said second position releases said first engagement member from said stopper protrusion to allow rotation of said rotational bobbin in said second direction.

19. The earphone winding device of claim 17, wherein said housing includes a guide protrusion positioned between said first and second guide rails and wherein said locker includes an arcuate shaped hole to receive said guide protrusion whereby said locker slides in the arcuate path between the first position and the second position.

20. The earphone winding device of claim 19, wherein said guide protrusion has an arcuate shape.

* * * * *